Figure 5A:
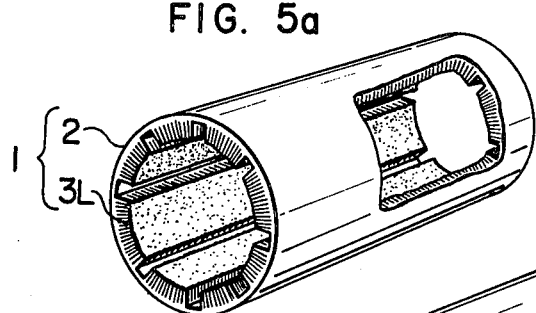

United States Patent [19]

Hakamada et al.

[11] 4,192,352
[45] Mar. 11, 1980

[54] INSULATOR FOR COVERING ELECTRIC CONDUCTORS

[75] Inventors: Takeshi Hakamada; Misao Soma; Ikushi Kano, all of Hitachi, Japan

[73] Assignee: Hitachi, Ltd., Japan

[21] Appl. No.: 601,044

[22] Filed: Aug. 1, 1975

[30] Foreign Application Priority Data

Aug. 9, 1974 [JP] Japan ................... 49-90834

[51] Int. Cl.² ............... H01B 7/02; H01B 3/00
[52] U.S. Cl. .................. 138/149; 174/110 N; 174/120 SR
[58] Field of Search ............. 138/149, 124, 125, 137, 138/150, 154, 177; 156/55, 56, 52; 428/35, 36; 174/138 D, 137 B, 120 SR, 121 R, 97, 174, 107, 110 N, 165 R

[56] References Cited

U.S. PATENT DOCUMENTS

| | | | |
|---|---|---|---|
| 2,289,734 | 7/1942 | Scott et al. | 174/121 SR |
| 2,461,594 | 2/1949 | Flounders | 138/137 |
| 2,551,710 | 5/1951 | Slaughter | 138/113 X |
| 3,162,722 | 12/1964 | Bartos | 174/120 X |
| 3,263,020 | 7/1966 | Thevenon | 174/120 R |
| 3,336,951 | 8/1967 | Huelster | 138/137 |
| 3,557,840 | 1/1971 | Maybee | 138/149 |
| 3,563,820 | 2/1971 | Nago | 156/54 |
| 3,581,776 | 6/1971 | Sheahan | 138/108 |
| 3,607,387 | 9/1968 | Lanza | 174/110 N |
| 3,692,619 | 9/1972 | Wedekind et al. | 138/137 X |
| 3,720,235 | 3/1973 | Schrock | 138/108 |
| 3,811,478 | 5/1974 | Ahlqvist | 138/154 |
| 3,854,371 | 12/1974 | Lamothe | 138/96 T |

FOREIGN PATENT DOCUMENTS 4622982 8/1967 Japan ................. 174/120 SR

Primary Examiner—Willis Little
Attorney, Agent, or Firm—Craig and Antonelli

[57] ABSTRACT

An insulator for covering electric conductors is used to cover, for the purpose of providing insulation, lead wires of the coils in rotary electric machines or stationary induction motors or conductors for connecting various electrical machinery and apparatus. The insulator is comprised of a flexible plastic film tube provided with a soft material on its inner surface. Such a construction prevents the insulation from being damaged even if the electric conductor has corners or bends or even if an external force is applied to the electric conductor because the soft material is compressed and deformed to absorb the applied force.

14 Claims, 8 Drawing Figures

U.S. Patent　　Mar. 11, 1980　　Sheet 1 of 2　　4,192,352
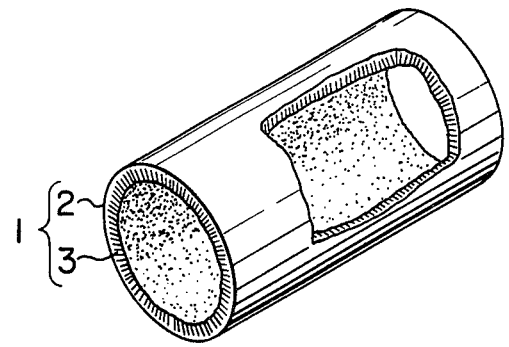
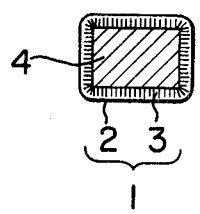
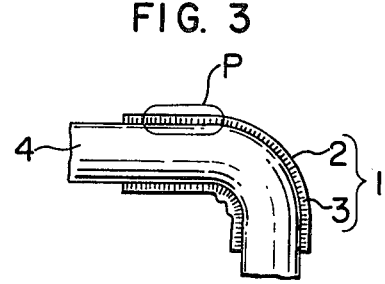
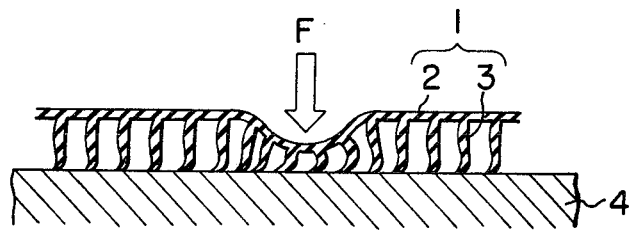

INSULATOR FOR COVERING ELECTRIC CONDUCTORS

The present invention relates to an insulator for covering electric conductors.

It is a common practice to wind insulating tape around an electric conductor to insulate that conductor. The work involved in winding the insulating tape provides no problem when the conductor is located at a relatively accessible place with no obstacles to such tape winding. On the other hand, the work involved in such tape winding becomes extremely difficult when the place to do the winding is narrow and has obstacles. This problem has been encountered with the lead wires of coils such as used in electric motors or generators and conductors for connecting these machines, and so forth. A recent trend in this field is the use of insulating tubes which make easier the work of insulating electric conductors, with a view to improving the efficiency of the insulating procedure. This insulating tube is used in such a manner that it is merely slid around the conductor. Therefore, the work involved in insulating a conductor with the insulating tube is much easier than that in which the above tape winding procedure is followed. Well-known insulating tubes are plastic tubes made of such materials as vinyl resin, polyethylene, and silicone rubber, and woven or nonwoven fabric tubes made of cotton, TETORON (trade mark for polyethylen terephthalate owned by Toray Industries, Inc and Teijin Limited), glass fibre, etc.

The plastic tube exhibits a relatively good electrical insulation characteristic, but is defective in that when the conductor to be insulated is rectangular in cross section or when it is subjected to a bending work as in the case of a lead wire, the tubular insulator tends to be injured at the portions thereof contacting the corners or at the bends of the conductor. Further, when some hard object impinges on or rubs against a portion of the plastic tube covering the electric conductor, that portion of the plastic tube may be cracked or broken.

The woven or the nonwoven fabric tube is, on the other hand, difficult to damage even if it is hit or rubbed with a hard object since the woven or nonwoven fabric tube is formed of a mass of fibres, and if it has at least a certain thickness, it possesses compressibility. Therefore any portions of the tube covering corners or bends or any portions of the tube which are hit by or rub against a hard object are compressed against the electrical conductor and/or absorb shocks caused by the hitting or rubbing in the process of being compressed. However, the woven or nonwoven fabric tube has also the disadvantage that its dielectric strength is lower than the dielectric strength of the plastic tube, because of the porosity of the fabric material.

Accordingly, an object of the present invention is to provide an insulator having a high dielectric strength for covering electric conductors.

Another object of the present invention is to provide an insulator having a high mechanical strength for covering electric conductors.

Another object of the present invention is to provide an insulator for covering electric conductors, which insulator provides a high dielectric strength and a high mechanical strength.

Another object of the present invention is to provide an insulator for covering electric conductors which reduces the work involved in applying the insulator to the electric conductor.

To achieve these objects an insulator for covering conductors comprises a flexible plastic film tube and a soft material formed on the inner face of the tube, with a sufficient flexibility of the tube being maintained to permit the conductor to freely be bent.

The above and other objects, features and advantages will be apparent from the following description taken in connection with the accompanying drawings, in which:

FIG. 1 is a perspective view broken away in part of an insulator for covering electric conductors according to the present invention;

FIGS. 2 and 3, respectively, are a cross sectional view and a longitudinally sectional view of the insulator of FIG. 1 into which an electric conductor is slid for insulation;

FIG. 4 is an enlarged sectional view of the part P shown in FIG. 3; and

FIGS. 5a–5c and 6, respectively, are perspective views partly broken away of other embodiments according to the present invention.

Referring now to FIG. 1, there is shown an insulator 1 for covering electric conductors embodying the present invention, which comprises a tube 2 made of flexible plastic film and a soft material 3 provided on the entire inner surface of the tube 2. The soft material may be provided in the form of fine fibers or filaments.

As shown in FIG. 2, when a conductor which is rectangular in cross section is slid into the thus constructed insulator 1, the insulator 1 is not damaged for the reason that the tube 2 does not contact directly the conductor 4 and the soft material 3 is compressed at the corners of the conductor 4 so that the portions of the tube covering these corners need not be abruptly curved. Actually, the corners of the insulator will be rounded thereby preventing any breakage of such portions of the tube 2.

Referring to FIG. 3, in case the conductor 4 has to be bent after it is covered with the insulator 1, large but thin creases are produced at the inner angle portion of the tube 2 due to the provision of the soft material 3 on the inner surface of the tube 2, while the tension exerted on the tube 2 is relieved at the exterior angle portion of the tube 2 due to the contraction of the soft material 3.

As described above, with the use of the insulator according to the present invention, the insulated conductor is no longer subject to sharp curves at the corners nor fine creases at the bends, and unusual tension on the tube covering the electric conductor 4 is eliminated. Accordingly, the thus insulated conductor is prevented from being broken.

Furthermore, in the case where working tools, such hammers or the parts of the electrical machinery such as bolts, drop on the insulator 1 covering the conductor 4 and hit or rub against the insulator 1, the soft material 3 is compressed to deform, as shown in FIG. 4, thereby to absorb the hitting or rubbing external force F. In this manner, the external force F may be relieved; however, without the soft material, such a force causes the tube 2 to be in high pressure direct contact with the conductor 4 or to be crushed thereby. Thus, the mechanical injury of the tube due to such forced pressure or crush is avoidable in accordance with this invention.

The insulator 1 as shown in FIG. 1 may be made by napping a flexible plastic film sheet to form a soft material, shaping the sheet into a cylinder so that the napped surface of the sheet constitutes the inside of the cylinder and then covering the outer surface of the cylinder with an adhesive film.

While the insulator 1 heretofore described has the soft material 3 which is a mass of filaments provided on the entire inner surface of the tube 2 by treating the inner surface of the tube, it is to be understood that the tube 2 and the soft material 3 are separately prepared and then these are united together to form an insulator 1. The soft material 3 may be, therefore, a felt consisting of a mass of fibers.

Figure 5B:
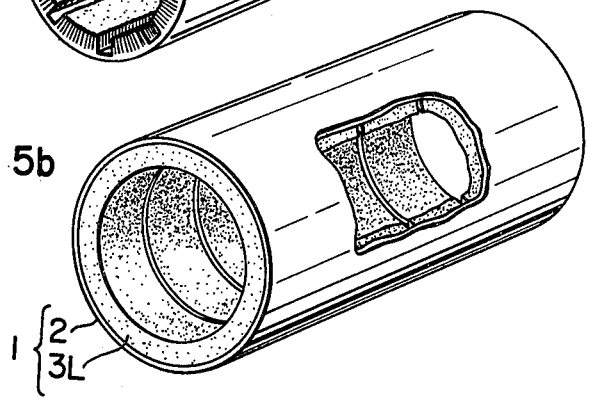
Figure 5C:
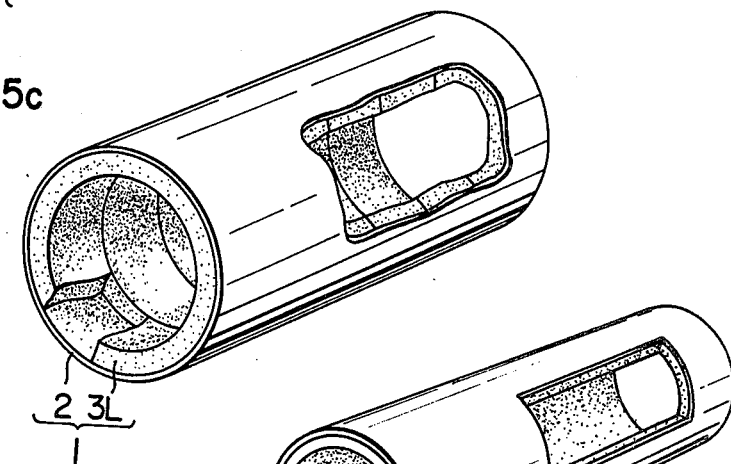
Figure 6:
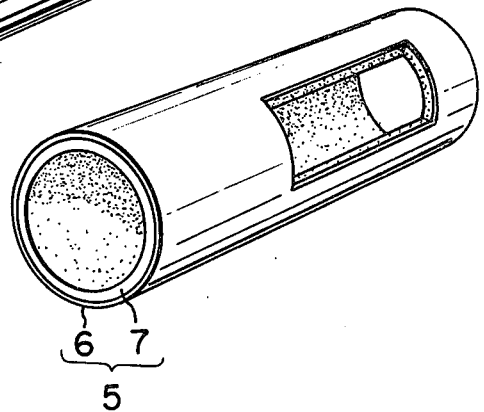

The soft material 3 heretofore described is formed on the entire inner surface of the tube 2, as shown in FIG. 1. But it is seen that the soft material 3 may consist of a plurlity of longitudinal blocks 3L arranged and spaced from one another circumferentially on the inner surface of the tube 2, as shown in FIG. 5a. The blocks may also be provided in the form of a plurality of cylindrical rings coaxially spaced from adjacent rings or arranged close to adjacent ones on the inner surface of the tube, as shown in FIGS. 5b and 5c. With such an arrangement, care must be taken so as not to locate corners or bends of the conductor in spaces or boundaries between the adjacent blocks 3L of the soft material 3 when such constructed insulator is fitted around the conductor. Otherwise, since there is no soft material into the spaces, the conductor 4 comes directly in contact with the tube 2 which may lead to mechanical damage to the tube 2 for reasons described above.

In practice, it is desirable to establish the inner diameter of the insulator smaller than the diameter of the conductor so that the insulator, when fitted to the conductor, it is resilient pressure contact with the latter. Thus, the insulator firmly holds the conductor therein without any slippage between the conductor and the insulator. This eliminates the need of superfluous means for fixing the insulator to the electric conductor. Thus, the work involved in fitting the insulator around the conductor is facilitated.

The insulator 1 may be made by applying nonwoven fabric to a polyimide film, winding the resultant combination around a core with the nonwoven fabric in contact with the core without forming an overlapping portion, covering the resultant combination with another polyimide with an adhesive and removing the core after the adhesive is hardened.

An example of the insulator covering an electric conductor according to the present invention will now be described. The conductor is a lead wire of the stator coil of an induction motor having a rated voltage of 3 KV, the output power of which is 132 KW. An insulator 5 is provided in the form of a tube 6 may by winding a polyimide film and a soft material 7 made of a polyamide nonwoven fabric bonded onto the inner surface of the tube 6.

The requirements for the lead wire insulation for induction motors, particularly those of the 3 KV class or higher are as follows:

(1) to withstand the test voltage prescribed for the rated voltage, (2) to tightly fit the insulator around the conductor so as not to provide a gap therebetween, (3) to be free from damage and cracking of the insulation irrespective of the shape of the conductor or the bending operation which the conductor is subjected to, and (4) to be easily applicable to the conductor to effect coverage thereof.

In order to fill these requirements, the insulator 5 is physically designed such that the tube 6 and the soft material 7 are 0.05 mm and 2 mm in thickness, respectively. When such insulator 5 is fitted around the conductor of a flat type lead wire, such as 1.8 mm × 3.5 mm, the soft material 7 is reduced about 50% in thickness and the resultant insulator 5 becomes 1.05 mm in thickness. Following this, the insulator with the conductor is bent at a right angle, and then it is connected with an adjacent lead wire. Finally, the entire coil of the stator is immersed in epoxy resin stored in a varnish tank and is hardened.

A comparison was made of the insulator formed in accordance with the above-described embodiment of the present invention vs. various conventional ones as to certain important properties. As the conventional insulators, the following constructions were employed: (A) an insulation tube 0.62 mm thick was made by twice winding a glass mica tape in a half-lapped manner, (B) a silicone rubber tube 1.5 mm thick, and (C) a glass fibre woven fabric tube 1.5 mm thick. Lead wires were covered with these insulators in the same manner as described above. The result of the comparison is tabulated in the following table.

| Lead wire Insulation Properties | Present Invention | (A) | (B) | (C) |
| --- | --- | --- | --- | --- |
| Dielectric strength (KV/mm) | 18/1.05 | 15.5/0.62 | 22/1.5 | 18/1.5 |
| Tightness | Excellent | Excellent | Good | Poor |
| Resistance for bending injury | Excellent | Excellent | Poor | Poor |
| Required amount of work for insulation | 25 | 100 | 50 | 25 |

It is desirable to take at least 15 KV/mm as the dielectric strength in view of the test voltage of 3 KV as well as a safety factor. Thus, the thickness of the respective insulators was established so as to fulfill the requirement. The result was that the sample (A) exhibited the most excellent property and the embodiment of the present invention is ranked next to the former in dielectric strength. The tightness of the insulator to the electric conductor was observed such that the embodiment of the present invention and the sample (A) were ranked first and the samples (B) and (C) were ranked second and third, respectively. The excellent degree of the tightness found in the embodiment of the present invention and the sample (A) results from the fact that, in the case of the embodiment of the present invention, the soft material 7 on the inner surface of the tube 6 is compressed to ensure the tightness between the insulator and the conductor, and in the case of the sample (C), the tube is simply applied around the condutor so that only a poor tightness is expected. In the case of the sample (B), the material constituting the tube was thermally contracted: the tube having a wall thickness of 1 mm was applied around the lead wire and then it is heated to reduce its inner diameter so that the wall thickness becomes 1.5 mm. However, the contraction of the tube was not uniform over the entire lead wire. It is for this reason that the tightness of this example is inferior to those of the embodiment of the present invention and the sample (A).

The comparison of the tightnesses of the various tubes could be performed easily by merely observing the appearance of the tubes or measuring their dimensions. An electric conductor having a rectangular cross section was used for the comparison. In the case of the sample (B) of the silicone rubber tube, the corner portions had a thickness equal to 70 to 80% of that of the flat portion. In the glass fibre tube of the sample (C), the conductor was in contact with the tube only at the corner portions while gaps were formed between the conductor and the tube at the flat portions. These facts were supported by the result of measuring the physical dimensions.

With respect to the bending of a lead wire covered with an insulator, the embodiment of the present invention permitted the covered lead wire to be bent without any mechanical damage to the insulator, since the soft material 7 prevents the tube from being abruptly bent. The sample (A) of the tape winding insulator also exhibited a good result in the bending test since the tape is readily slidable relative to the adjacent tape in the lapped condition. The sample (B) tube was broken when it was bent irrespective of whether it was heated or not for contraction. Further, the sample (C) tube was fractured at the bending of the lead wire.

With respect to the working efficiency, when the respective insulators are applied to the lead wires for coverage, the embodiment of the present invention exhibited an excellent working efficiency because of a simple work of sliding the insulator 5 into the tubular insulator with a result that the soft material 7 is compressed to secure the tightness of the insulator around the lead wire. In the samples 2 and 3, the tubes were easily fitted around the lead wire, although the sample (B) has a relative increase of the steps of the fitting work because the additional heating step for contraction is necessary. The sample (A) was the worst regarding working efficiency because of the tape winding operation which is a time-consuming troublesome operation. Assuming that the amount of work required for insulating the lead wire with the sample (A) tube is 100, the required work amount with the embodiment of the present invention and that with the sample (C) tube was 25 while that with the sample (B) was 50.

The full study of the result of the experiment shows that the insulator 5 of the embodiment of the present invention is the best when compared with the properties of the respective sample insulators.

While the present invention has been described in conjunction with the lead wire insulation of the stator coil of an electric motor, it should be understood that the insulator of the present invention may also be applied to any electric conductor used in the electrical machinery and apparatus.

Moreover, in the case where the soft material on the tube is made of a porous material, such as nonwoven fabric, the soft material may be used in a semihardened state by preliminary impregnation of the soft material with an adhesive, such as epoxy resin. This is particularly effective when it is applied to the insulation of conductors of the electrical machinery and apparatus where it is impossible to immerse the entirety of that insulator into the varnish tank. That is, in such a case, the adhesive impregnated in the soft material may be hardened after the insulator is fitted around the conductor.

As described above, in the present invention the soft material is formed on the inner surface of the tube made of flexible plastic film. With such a construction, the mechanical damage to the insulator may be prevented even if the electric conductor has corners or bends, since the soft material is deformed at the corner or bend portions of the insulator so that the deformation serves to prevent the insulator from being acutely deformed. Further, when an external force is applied to the insulator covering the electric conductor, the soft material is compressed so as to deform and thus to absorb the external force, i.e. the soft material serves as a buffer between the electric conductor and the tube. As a result, the damage to the insulator due to the application of the external force is prevented. In addition, an excellent dielectric strength is obtained due to the fact that the insulation is made of a plastic tube provided with a soft material on its inner surface and thus the insulator is well fitted around the electric conductor.

Moreover, the soft material of the tube is compressed to ensure a tight contact between the electric conductor and the insulator with the result that the insulator is prevented from slipping out of the conductor. This means that no additional slip-preventive means is necessary and therefore the insulation covering work is facilitated.

Consequently, this invention provides an insulator with a high dielectric strength and an excellent mechanical strength, as compared with the conventional insulator for electric conductors formed by tape winding.

What is claimed is:

1. An insulator for covering electric conductors comprising a flexible plastic tube of polyimide film and a soft material layer of polyamide non-woven fabric secured to the inner surface of said tube, said soft material layer covering substantially the entire inner surface of said tube.

2. An insulator according to claim 1, in which said soft material layer is provided as a plurality of adjacently positioned soft material blocks disposed on the inner surface of said tube.

3. An insulator according to claim 2, in which said soft material blocks consist of circumferentially adjacent elongated strips extending longitudinally of said tube.

4. An insulator according to claim 2, in which said soft material blocks consist of a plurality of longitudinally adjacent rings.

5. An insulator according to claim 1, in which said soft material consists of said polyamide fabric impregnated with an adhesive so as to be in a semi-hardened state.

6. An insulator according to claim 1, wherein said soft material is a material which is compressible in the radial direction of said tube and has a thickness substantially greater than the thickness of said flexible plastic tube.

7. An insulator according to claim 6, wherein said soft material layer is constructed to be reducible in thickness up to approximately 50% upon insertion of a conductor therein.

8. An insulator according to claim 1, wherein said soft material is impregnated with a hardenable resin in a semi-hardened state, whereby a hardened condition maybe achieved after installation, by heating.

9. In an electric conductor having an insulated covering the improvement in said insulated covering comprising a flexible plastic tube made of polyimide film and a soft material layer of polyamide non-woven fabric secured to the inner surface of said tube, said soft material layer covering substantially the entire inner surface of said tube.

10. A conductor according to claim 9, in which said soft material consists of said polyamide fabric impregnated with an adhesive so as to be in a semi-hardened state.

11. A conductor according to claim 9, wherein said soft material layer is formed as a radially compressible layer of substantially greater thickness than the thickness of said flexible plastic tube, and wherein said conductor comprises a conductive central core inserted within said insulated covering so as to substantially compress said compressible layer against said plastic tube.

12. A conductor according to claim 11, wherein said conductive central core compresses said compressible layer so as to reduce its thickness by approximately 50%.

13. A conductor according to claim 9, wherein said central conductive core is of rectangular transverse cross-sectional shape.

14. An electric conductor according to claim 9, wherein said soft material is impregnated with a hardenable resin in a semi-hardened state, whereby a hardened condition maybe achieved after installation, by heating.

* * * * *